March 15, 1966 L. W. WELLS 3,240,549
PROJECTING 3-DIMENSIONAL PICTURES FOR DIRECT VIEWING
Filed Dec. 4, 1963
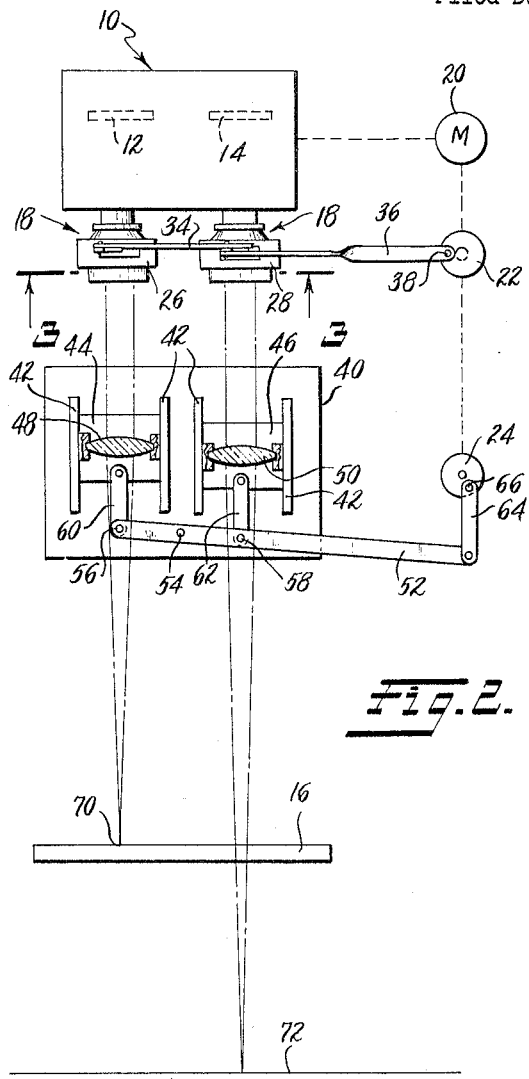
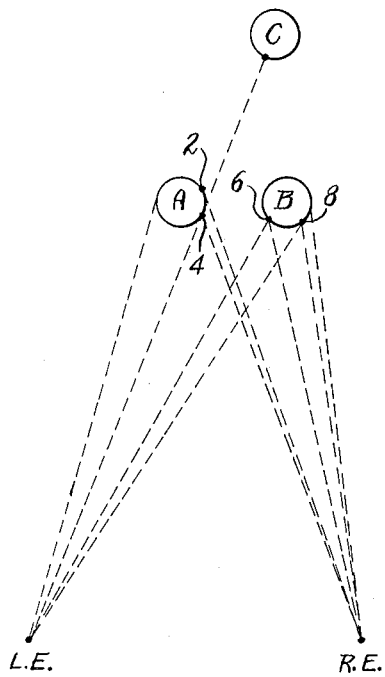
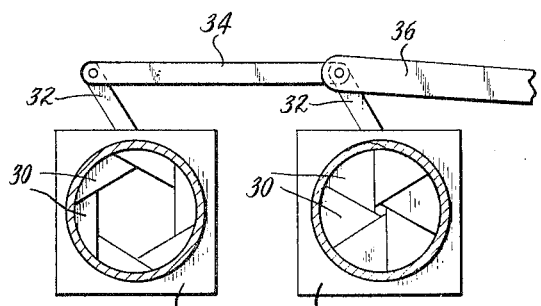
INVENTOR
Leon W. Wells
BY
Lyon & Lyon
ATTORNEYS

United States Patent Office 3,240,549
Patented Mar. 15, 1966

3,240,549
PROJECTING 3-DIMENSIONAL PICTURES FOR DIRECT VIEWING
Leon W. Wells, Closter, N.J., assignor to Panopix Research, Inc., New York, N.Y., a corporation of New York
Filed Dec. 4, 1963, Ser. No. 328,045
6 Claims. (Cl. 352—43)

This invention relates to the projection of stereoscopically related pictures onto a screen for direct viewing, without the use of spectacles or the like and contemplates such projection of either still pictures or moving pictures.

The production of stereoscopically related pictures, either as individual pairs of still pictures or as adjacent frames on moving picture film is well known. The pictures are conventionally produced by simultaneously photographing a scene from two positions laterally spaced apart about the same distance as the normal spacing between a person's eyes. Heretofore it was believed that the pictures could be viewed by an observer with depth perception only by limiting observation of the respective pictures to respectively separate eyes. For this reason it has been customary to provide the viewer with suitable spectacles or equivalent apparatus whereby each eye is limited to viewing only one of the pictures, or a projection thereof, to the exclusion of the other. The present invention relates to a method of projecting such pictures for viewing wherein the observer needs no spectacles, filters or other restrictive apparatus but may view the entire projection with both eyes and still perceive the scene in depth.

An average person can view objects up to about 450 yards distance and still have a sense of depth perception. As the distance to the object increases, the depth perception decreases. This approximate distance is determined by the interocular distance of the particular individual, which is normally about 2½ to 2¾ inches. As the interocular distance is increased, by the use of prisms, binoculars or the like, the distance at which the viewer can still have depth perception is thus increased.

At least part of the sensation of depth perception is due to movement of the eyes in viewing objects and as the distance to the object increases, the necessary movement of the eyes to encompass the entire scene becomes less and less, and this movement is unquestionably an important factor in depth perception. For this reason even a one-eyed person can view a nearby object and achieve depth perception, because even a single eye will normally move, up to one-half inch, when normally viewing a solid object or a scene. A normal two-eyed person, as stated above, can perceive depth up to a distance of about 450 yards, although not as well as for shorter distances, for instance depth perception at 300 yards is not as acute as it is at 100 yards. A one-eyed person can judge depth only up to a maximum distance of about 60 yards by moving the eye quickly back and forth and keeping the image in his mind. The depth perception enjoyed by a one-eyed person at a distance of 60 yards, however, is approximately equivalent to the depth perception enjoyed by a normal two-eyed person at about 450 yards.

It is well known that any object in motion is normally viewed with a keener sense of depth perception than a stationary object and this is because each eye sees a point at a certain angle at one instant and a split second later the eye moves from its original position. The eye sees the same point under a different set of conditions, that is, at a different angle, different light intensity and so forth, and the persistence of vision retains successive images for a time. The retained images are combined in the mind and depth perception results.

It is applicant's conclusion that the experiencing of depth perception is not limited to the exclusive viewing of separate images by each eye. Many points in a viewed scene are observed simultaneously by both eyes and appear substantially the same in any pair of stereoscopically related pictures with the exception of the angle at which they are seen and the light intensity received therefrom. It is apparent then that the relative light intensity received from a given point by the different eyes and the angle at which that point is viewed (along with the focal distance thereto) are large factors in producing depth perception in the mind of a viewer.

It has heretofore been proposed to rapidly and alternately project right-eye and left-eye images onto a screen, for direct viewing, but such system was not successful because the abrupt discontinuities between images made the scene appear to "jump." The present invention avoids the above difficulty by effecting a smooth and continuous transition from one image to the other by continuously and alternately changing their focus and light intensity.

The present invention relies on the above principles and consists of the simultaneous projection of stereoscopically related pictures onto a viewing screen. However, the separate images are alternately and inversely modified by changing the focus and light intensity thereof at a frequency sufficiently high that the persistence of vision will not permit detection of those variations. The images from the two pictures are changed as to focus and light intensity in a cyclical manner and so that one image is projected onto the screen at maximum intensity and in sharp focus at a time when the other image is at maximum defocus and of substantially zero light intensity. The mind of the viewer then combines these simultaneously viewed but changing images to produce true depth perception without the scene appearing to "jump."

It is, therefore, a principal object of this invention to provide a method of projecting stereoscopically related pictures onto a viewing screen whereby the viewer may see the picture in full depth without the use of spectacles or other restrictive devices.

A more particular object of the invention is to provide such a method as set forth wherein the separate stereoscopically related pictures are projected simultaneously but varied in focus and light intensity relative to each other, in such manner that the viewer of the projected picture experiences stable depth perception.

Additional and further objects and advantages will become apparent to those skilled in the art as the description proceeds with reference to the accompanying drawings wherein:

FIG. 1 is a diagram to illustrate the optical principles upon which the present invention relies;

FIG. 2 is a schematic view of apparatus arranged to exemplify the principles of the present invention; and FIG. 3 is an enlarged front elevational view of portions of the apparatus of FIG. 2, as seen from the line 3—3 of FIG. 2.

Referring first to FIG. 1, A, B, and C represent objects in a field of view observed by the eyes of a viewer, represented by the points LE and RE, left eye and right eye, respectively. It will be readily apparent that a ray of light from point 2 on object A to the right eye cannot be seen by the left eye. While a ray from point 4 on object A can be seen by both eyes but the left eye sees that point superimposed over some portion of object C. The point on object C cannot, however, be seen by the right eye since object B intervenes. It will be further apparent that light from point 4 on object A reaching the left eye is of minimum intensity since very light will reflect from point 5 tangent to the surface of object A. However, light received by the right eye from point 4 on object A is of much higher intensity since the ray from that point to the right eye is more nearly normal to the surface of the object, thus, while both eyes can see point 4, the intensity of the light reaching the left eye from that point is substantially zero whereas the light intensity reaching the right eye from that same point is at a maximum. Thus, it is obvious that observation of the same point by the two different eyes is not only at a different angle to any given reference plane but also varies in intensity. By the same analysis it will be apparent that point 6 on object B appears brighter to the left eye than it does to the right eye whereas point 8 on object B appears brighter to the right eye than it does to the left eye. At the same time, the distance from the left eye to point 6 or point 8 is greater than the distance from the right eye to those corresponding points and thus the focus adjustment of the respective eyes must be different to observe those points with proper sharpness. It is also apparent that when the attention of the viewer shifts from point 6 on object B to point 4 on object A, the focal sharpness in the right eye changes while the shift is being made, as does the focal sharpness in the left eye. This is in large part due to the fact that the points in sharpest focus are those whose rays enter the eye along the axis of the eye's lens. For points to a side of that axis the sharpness of focus is less and sharpness further decreases as the lateral distance from that axis increases. Also, in one instance, the focal length is decreased while in the othter instance, it is increased, and at the same time the intensity of light received by the respective eyes decreases as to the left eye and increases as to the right eye. Obviously, the same analysis could be performed with regard to any selected points of object A and C which are in different depth planes and it would be found that the major changes producing different responses in the two eyes are the changes in focal distance and sharpness and light intensity received by the two eyes. It will also be apparent that in shifting one's attention to different points on the same object or to different objects, the angle through which the rays enter the respective eyes and the amount the eyes must shift are sensible factors and further assist in producing the effect of depth perception.

The apparatus of FIGS. 2 and 3 is merely a schematic representation of an arrangement for effecting projection of stereoscopically related images to produce the variations discussed above. With reference to FIG. 2, numeral 10 represents any suitable projection apparatus in which a stereoscopically related pair of pictures 12 and 14 are positioned and images thereof are projected forwardly in the direction of a viewing screen 16 through suitable lens systems 18. It is to be understood that the projector 10 may be a projector for still pictures or may be a moving picture projector wherein the pictures 12 and 14 are in side by side relation on moving picture film. The structure of such projectors is well known and need not be further described.

Numeral 20 indicates a suitable motor or driving means for operating the moving picture projector 10 but the connection thereto may be omitted in the case of the projection of still pictures. The motor 20 also drives a pair of crank devices 22 and 24. Within each of the projection lens systems 18, at the nodal plane therein, is a pair of iris-type shutters 26 and 28. The iris-type shutters are shown merely for purpose of illustration, it being understood that any other type of light-intensity modifying device may be employed at any suitable location between the pictures 12 and 14 and the screen. Each of the shutters 26 and 28 is shown as comprising a plurality of iris plates 30 and an operating lever 32. The lever 32 in each instance is so arranged that swinging movement in one direction will open the shutter to pass maximum light therethrough whereas swinging movement in the other direction will close the shutter to obstruct substantially all light. The shutters 26 and 28 are so arranged, as shown in FIG. 3, that swinging movement of their respective levers 32 in the same direction will open one shutter while closing the other and swinging movement in the opposite direction will close the first one and open the second. The levers 32 are interconnected by a suitable link 34 pivoted to each and a connecting rod 36 is pivoted at one end to the link 34 and one of the levers 32 and is pivoted at its other end to an eccentric pin 38 on the crank device 22. It will thus be apparent that rotation of the motor 20 will cause the shutters 26 and 28 to alternately open and close so as to alternately and sequentially obstruct the light emanating from the repsective lenses 18 of the projector 10.

Positioned forwardly of the shutters 26 and 28 and between those shutters and the viewing screen 16 is a lens assembly comprising a suitable base 40 provided with guide means 42. The guide means 42 extend in a direction generally parallel to the direction of projection of images from the pictures 12 and 14 and guided therebetween are slides 44 and 46. Slide 44 supports a lens 48 through which the projected image from picture 12 passes and the slide 46 supports a lens 50 through which the image from picture 14 passes. A rock lever 52 is pivoted at 54 to the base 40 and point 56 and point 58 thereon, spaced equal distances on opposite sides of the pivot 54, are pivotally connected, through links 60 and 62, to slides 44 and 46, respectively. The outer end of rock lever 52 is pivotally connected to a connecting rod 64 which is in turn pivoted on an eccentric the motor 20 will not only actuate the shutters 26 and 28, as described, but will also rock the lever 52 so as to cause the lenses 48 and 50 to "vibrate" in a direction toward and from the viewing screen 16. The actual movement of the lenses is very small, and may be of the order of 30 to 40 thousandths of an inch, to achieve applicant's objectives, as will be more fully described. The angular relationship of the crank devices 22 and 24 is such that the shutter 26 is at maximum opening at a time when the lens 48 is at the end of its stroke nearest the shutter 26 and at the same time the shutter 28 is closed while lens 50 is at its maximum distance from shutter 28. Thus, the maximum amount of light from picture 12 passes through the shutter 26 and lens 48 while no light passes through the shutter 28 or lens 50. As rotation of the motor continues, however, lens 48 starts to move away from shutter 26 and that shutter starts to close while lens 50 starts to move toward shutter 28 and the latter starts to open. The shutters and their operating mechanism are so designed that the total light passing through both shutters remains substantially constant at all times to thus produce a total illumination on the screen 16 that is substantially constant.

The described movement of the lenses 48 and 50 has the effect of focusing and defocusing the images projected onto the screen 16. The elements are so related that when either lens is in its rearmost position, that is, nearest its shutter 26 or 28, the image from its corresponding picture 12 or 14 is thereby brought into sharp focus on the viewing surface of the screen 16, as indicated at 70. Thus, the image from picture 12 is in sharp focus on the viewing surface of screen 16, at a time when the shutter 26 is at maximum opening and thus the image of picture 12 is also at maximum intensity. The movement of either lens 48 or 50 in a direction away from its corresponding shutter actually defocuses the image appearing on the screen 16 but the projected image has an imaginary focus displaced from the viewing surface of the screen. As the focal plane of an image moves rearwardly, the eye tends to "follow" it and thus the impression is given that the scene actually extends to the rear of the viewing screen. As shown in FIG. 2, the lens 50 is at the forward end of its stroke and in this position it would focus the image from picture 14 in a plane 72 positioned quite some distance behind the viewing screen 16. It is contemplated that, for motion picture use at least, the distance from the front face of screen 16 to the plane 72 may be of the order of thirty feet.

Hereafter the imaginary plane in which the image from either picture 12 or 14 would be focused by its respective lens 48 or 50 will be referred to as the focal plane of that image. As shown in FIG. 2, the focal plane of the image from picture 12 coincides with the viewing surface of screen 16, while the focal plane of the image from picture 14 is at maximum displacement from the screen 16. Preferably, the displacement of the focal planes of the images vary from a position coincident with the screen to a position therebehind so that it will be viewed by the observer and the effect of depth will be observed as though the action were taking place behind the actual viewing surface.

The drawings suggest that the images from 12 and 14 are projected onto different areas of screen 16, but they are shown that way merely to simplify the description, actually they will both be projected onto a single viewing area, spaced only the normal interocular distance apart, as they were originally taken.

It is to be understood that the structural arrangement schematically shown in FIG. 2 is merely for the purpose of illustrating the principles of the invention and that any other suitable method or means for changing the position of the focal planes of the images relative to screen 16 and/or varying the light intensity of the images may be employed. It is further contemplated that the oscillating lenses and/or the shutters 26 and 28 may be incorporated in and constructed as part of the projector 10 rather than as a separate mechanism exterior thereof.

When projecting still pictures the motor 20 would operate at such speed that complete cycles of oscillation of both lenses 48 and 50 are performed at such frequency that the persistence of vision of the observer will not permit detection of the individual variations but will view the projected pictures in a continuous and uninterrupted manner. It is contemplated that for the projection of still pictures complete cycles shall be performed at the frequency of at least 24 times per second.

When the pictures 12 and 14 are adjacent frames of a moving picture film and the scene is a motion picture, a somewhat different frequency of operation of the shutters and lenses is necessary. The standard rate of projecting successive frames of moving pictures is 24 frames per second. To effect such projection it is necessary that the screen be completely dark for a period of time while the film is being moved to a new position in the projector and the new frame is then projected for a period of time until the screen is again darkened for a subsequent film movement. Customarily the screen is darkened by means of a rotary shutter in the projector, which shutter obstructs the passage of light to the screen to darken the same and then moves out of the light path to effect projection of the image. In many projectors, the screen is dark about one-half the time and an image is being projected the other half. Therefore, if the frames are projected at the rate of 24 frames per second, each frame is being projected on the screen for only 1/48th of a second. In other systems multi-bladed shutters are employed and each frame is visual on the screen for a shorter period of time, in some instances only 1/96th of a second. In any event, the projection of motion pictures in a manner to embody the present invention will be performed by actuating lenses 48 and 50 and shutters 26 and 28 through a complete cycle of operation for each projection of a picture frame onto the screen. Thus, with different projection systems the frequency of the completion of the above cycle must take place in 1/48th or 1/96th of a second, and during the time the motion picture projector shutter is "open."

While a single form of apparatus has been described for practicing the method of the present invention, it is not limited thereto but contemplates the use of any apparatus capable of performing the method encompassed by the appended claims.

I claim:

1. The method of projecting three dimensional pictures onto a viewing screen, comprising the steps of: simultaneously projecting images from stereoscopically related pictures toward a viewing screen; cyclically and continuously changing the distance between the focal plane of each image, and said screen so that said focal planes alternately and momentarily coincide with said screen and so that the focal plane of one image coincides with said screen at a time when the focal plane of the other image is at maximum displacement therefrom; and continuously and inversely changing the light intensity in each projected image so that each is at maximum intensity when its focal plane coincides with said screen and substantially zero when its focal plane is at its maximum displacement from said screen.

2. The method defined in claim 1 including the step of continuously changing the light intensity of each of said images at such rate that the total illumination on said screen remains substantially constant.

3. The method defined in claim 1 wherein said cycles of changing the relative positions of said focal planes and screen are repeated at a rate of at least twenty-four times per second.

4. The method defined in claim 1 wherein said screen is maintained stationary and said focal planes of said images are moved into and out of coincidence therewith.

5. The method defined in claim 4 wherein lens means are employed to focus said images in their respective focal planes; and including the step of reciprocating said lens means toward and from said screen to change the positions of said focal planes relative to said screen.

6. The method defined in claim 1 wherein said stereoscopically related pictures comprise adjacent frames on a strip of motion picture film; said step of projecting said images being performed by alternately and repeatedly darkening said screen while moving said film and then projecting said images from said adjacent frames, while said film is stationary; a complete cycle of changing the relative positions of said focal plane and screen, for both said images, being performed during each projection of images from adjacent frames.

References Cited by the Examiner

UNITED STATES PATENTS

| 1,241,828 | 10/1917 | Davis | 352—207 |
| 1,714,849 | 5/1929 | Daponte | 352—43 |

FOREIGN PATENTS

| 239,270 | 8/1925 | Great Britain. |

JULIA E. COINER, *Primary Examiner.*